United States Patent
Wu et al.

(10) Patent No.: US 11,619,862 B2
(45) Date of Patent: Apr. 4, 2023

(54) CAMERA SHUTTER

(71) Applicant: Lanto Electronic Limited, Kunshan (CN)

(72) Inventors: Fu-Yuan Wu, Taipei (TW); Meng-Ting Lin, Taipei (TW); Shang-Yu Hsu, Taipei (TW); Yu-Cheng Lin, Taipei (TW); Chun-Hui Wu, Taipei (TW)

(73) Assignee: LANTO ELECTROINIC LIMITED, Kunshan (CN)

( * ) Notice: Subject to any disclaimer, the term of this patent is extended or adjusted under 35 U.S.C. 154(b) by 0 days.

(21) Appl. No.: 17/583,571

(22) Filed: Jan. 25, 2022

(65) Prior Publication Data

US 2022/0382129 A1     Dec. 1, 2022

(30) Foreign Application Priority Data

May 25, 2021   (CN) .......................... 202110571802.8

(51) Int. Cl.
    *G03B 11/04*    (2021.01)
    *G03B 9/36*    (2021.01)
    *G03B 7/01*    (2021.01)

(52) U.S. Cl.
    CPC ................. *G03B 9/36* (2013.01); *G03B 7/01* (2015.01); *G03B 11/043* (2013.01)

(58) Field of Classification Search
    CPC ........... G03B 11/043; G03B 9/36; G03B 7/01
    See application file for complete search history.

(56) References Cited

U.S. PATENT DOCUMENTS

| | | |
|---|---|---|
| 2020/0177777 A1 | 6/2020 | Imai et al. |
| 2020/0249415 A1* | 8/2020 | Wang ..................... G03B 30/00 |
| 2022/0091478 A1* | 3/2022 | Sawanobori .......... G06F 1/1686 |
| 2022/0120997 A1* | 4/2022 | Wang ..................... G02B 7/005 |
| 2022/0121086 A1* | 4/2022 | Wang ....................... G03B 9/02 |

FOREIGN PATENT DOCUMENTS

| | | |
|---|---|---|
| CN | 111522120 A | 8/2020 |
| CN | 111581680 A | 8/2020 |
| CN | 211698365 U | 10/2020 |
| TW | I700548 B | 8/2020 |

* cited by examiner

*Primary Examiner* — Clayton E. LaBalle
*Assistant Examiner* — Diana Hancock
(74) *Attorney, Agent, or Firm* — Birch, Stewart, Kolasch & Birch, LLP

(57) ABSTRACT

A camera shutter for exposing or shielding a camera including a supporting portion, a winding assembly, a movable cover, and a magnet is provided. The winding assembly is capable of driving the magnet to move the movable cover along a first direction while a first current passes through the winding assembly to form a first magnetic field, and to make the shielding side of the movable cover shield the camera. The winding assembly is also capable of driving the magnet to move the movable cover along a second direction while a second current passes through the winding assembly to form a second magnetic field, and to make the shielding side of the movable cover away from the camera to expose the camera.

17 Claims, 13 Drawing Sheets

CAMERA SHUTTER

CROSS REFERENCE TO RELATED APPLICATION

This application claims the priority benefit of Chinese Patent Application Ser. No. 202110571802.8, filed on May 25, 2021, the full disclosure of which is incorporated herein by reference.

BACKGROUND

Technical Field

The present disclosure relates to the technical field of a shutter, particularly to a camera shutter.

Related Art

With the advancement of optical component manufacturing process and the development of miniaturization of electronic components, as well as the demand of modern people for audio and video sharing, current portable electronic products are equipped with at least one camera for users to take photos or video files.

Due to the development of current network and diversification of working modes, portable electronic products with cameras, such as smartphones and laptops, are often used in life and at work. However, in some situations, a camera of a laptop is used when conducting a video conference. If the user neglects to stop the camera after the video conference, the privacy may leak out due to the continuous shooting of the camera. For another example, if a portable electronic product is hacked, it may be forced to enable the camera to shoot without the user's knowledge, posing a significant threat to the user's privacy.

In order to avoid the above privacy issues, some portable electronic products such as laptops are equipped with a camera shutter on a camera, allowing the user to manually open the camera shutter and conduct a meeting when the camera is exposed. Then the user manually closes the camera shutter, so that the camera is blocked and cannot continue to shoot.

However, the camera shutter with manual control is limited by the structural design, and it is easy to affect the adhesion due to wear between components under long-term use. What's more, it is unable to move due to jamming between the components.

In view of this, how to provide a camera shutter, which can be used to automatically control the exposing and shielding of the camera, while avoiding a wear condition caused by mutual movement between the components is a problem that needs to be solved urgently in the industry.

SUMMARY

Embodiments of the present disclosure provide a camera shutter. The camera shutter is used to solve a wear condition occurs between a movable cover of a current camera shutter and a supporting portion while frequently operated, and to solve the problem that the current camera shutter is difficult to use a simple structure for accurate positioning.

Embodiments of the present disclosure provide a camera shutter, which comprises:

a supporting portion, wherein the supporting portion comprises a base and two side walls disposed on two sides of the base, and the base and the two side walls define a receiving space;

a winding assembly disposed in the receiving space;

a movable cover disposed above the supporting portion and the winding assembly, wherein a first surface of the movable cover abuts against the two side walls of the supporting portion, and the movable cover comprises a shielding side and a magnetic side opposite to the shielding side; and a magnet disposed on the magnetic side of the movable cover and is located on the first surface of the movable cover;

wherein the winding assembly is capable of driving the magnet to move the movable cover along a first direction while a first current passes through the winding assembly to form a first magnetic field, and to make the shielding side of the movable cover shield the camera; and the winding assembly is also capable of driving the magnet to move the movable cover along a second direction while a second current passes through the winding assembly to form a second magnetic field, and to make the shielding side of the movable cover away from the camera to expose the camera.

In another embodiment of the disclosure, the movable cover comprises a protrusion, the protrusion is protruded on the first surface of the magnetic side of the movable cover and located in the receiving space of the supporting portion, and the magnet is disposed in a slot of the protrusion.

In another embodiment of the disclosure, the winding assembly comprises a base body, a magnetic conductive sheet, a first pin and a second pin, the base body, the magnetic conductive sheet, the first pin, and the second pin together form an insert molding structure, and the first pin and the second pin respectively have a first terminal and a second terminal protruding outward from the base body.

In another embodiment of the disclosure, the first pin and the second pin protrude from a same side of the base body and are received in a side groove of the base.

In another embodiment of the disclosure, the first terminal of the first pin and the second terminal of the second pin protrude from a lower side of the base body and are received in a bottom groove of the base.

In another embodiment of the disclosure, the winding assembly further comprises a winding, the winding is wound on the first terminal, the base body, and the second terminal in sequence, or the winding is wound on the second terminal, the base body, and the first terminal in sequence.

In another embodiment of the disclosure, the winding assembly comprises two solders, and the two solders are respectively disposed on the first terminal with the winding and the second terminal with the winding.

In another embodiment of the disclosure, the magnetic conductive sheet and the magnet are configured to attract each other by magnetic force to carry out the positioning of the movable cover.

In another embodiment of the disclosure, the supporting portion comprises a plurality of first limiting structures, and the plurality of first limiting structures are respectively disposed on an upper side of the two side walls of the supporting portion and contact two second surfaces of the movable cover, the two second surfaces are opposite to each other and vertically connected to the first surface, and the plurality of first limiting structures are capable of guiding the movement of the movable cover along the first direction and the second direction.

In another embodiment of the disclosure, the supporting portion comprises a plurality of second limiting structures, and the plurality of second limiting structures are respectively disposed on the upper side of the two side walls of the supporting portion, the plurality of second limiting structures are capable of supporting the movable cover, and the plurality of second limiting structures are in contact with the first surface of the movable cover and space the first surface and the upper side of the two side walls from each other.

In another embodiment of the disclosure, the plurality of first limiting structures are respectively disposed on a side of the plurality of second limiting structures away from the upper side of the two side walls of the supporting portion.

In another embodiment of the disclosure, the camera shutter further comprises a housing, wherein the housing is disposed above the supporting portion to cover the movable cover, the winding assembly, and the supporting portion in sequence, the housing comprises two housing side walls extending toward the supporting portion, and the two housing side walls are capable of abutting against the base of the supporting portion.

In another embodiment of the disclosure, the housing side walls are provided with a plurality of openings, the side wall of the supporting portion is exposed from the adjacent plurality of openings, and the plurality of openings are used for dispensing glue to bond the housing side walls and the side walls of the adjacent supporting portion.

In another embodiment of the disclosure, the housing comprises a holding portion, and the holding portion is disposed on opposite sides of the two housing side walls.

In another embodiment of the disclosure, the movement and positioning of the movable cover along a horizontal direction are controlled by the principle of magnetic attraction through automatic control, so as to carry out the exposing and shielding operation of the camera and simplify an assembly structure and the number of components. Further, through the magnetic attraction of the magnetic conductive sheet to the magnet, the positioning of the movable cover along the vertical direction can also be accurately completed, avoiding possible shaking or deviation of the winding assembly while moving the movable cover without applying the first current or the second current.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The accompanying drawings illustrated herein are used to provide a further understanding of the present disclosure and form part of the present disclosure. The embodiments of the present disclosure and the description thereof are used to explain the present disclosure and do not constitute an undue limitation of the present disclosure.

DETAILED DESCRIPTION OF THE EMBODIMENTS

The technical solution in the embodiments of the present disclosure will be clearly and completely described below with reference to the accompanying drawings in the embodiments of the present disclosure. It is to be understood that the described embodiments are merely exemplary of the disclosure, and not restrictive of the full scope of the invention. All other embodiments, which can be obtained by a person skilled in the art without inventive step based on the embodiments of the present disclosure, are within the scope of the present disclosure.

Figure 1:
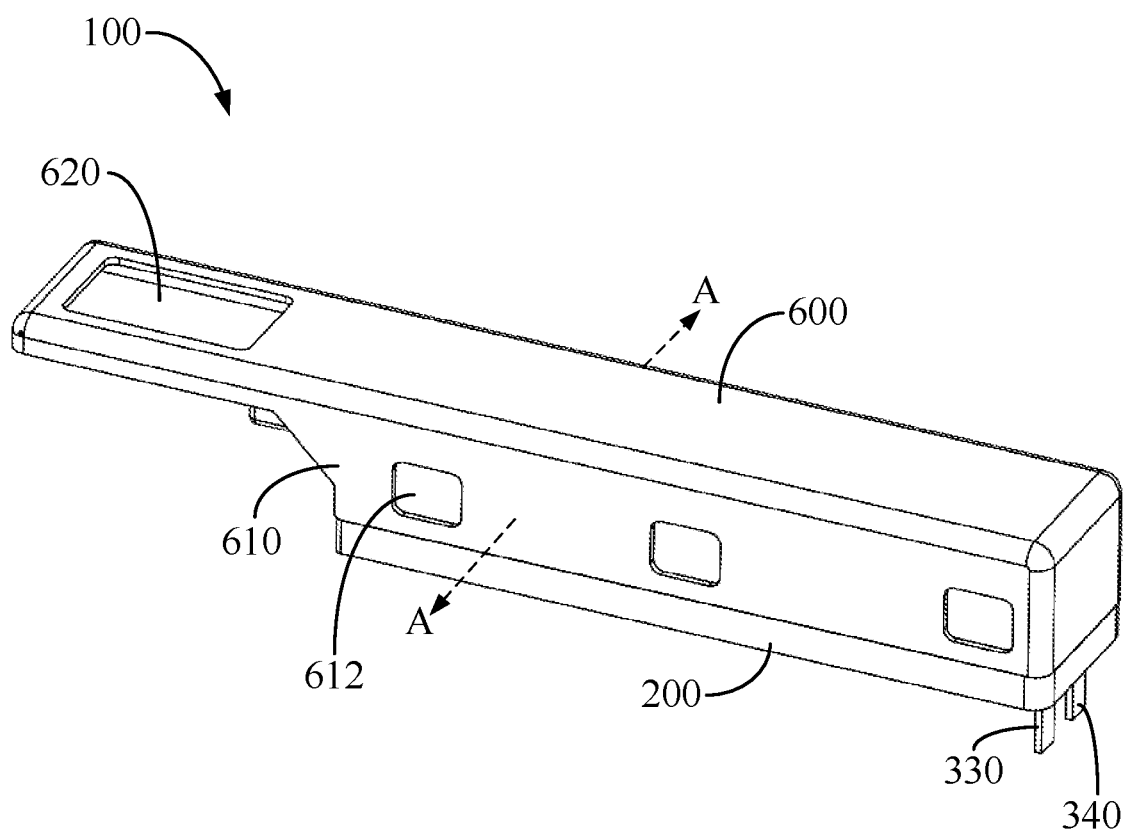
FIG. 1 is a perspective view of a camera shutter of the present disclosure.
Figure 2:
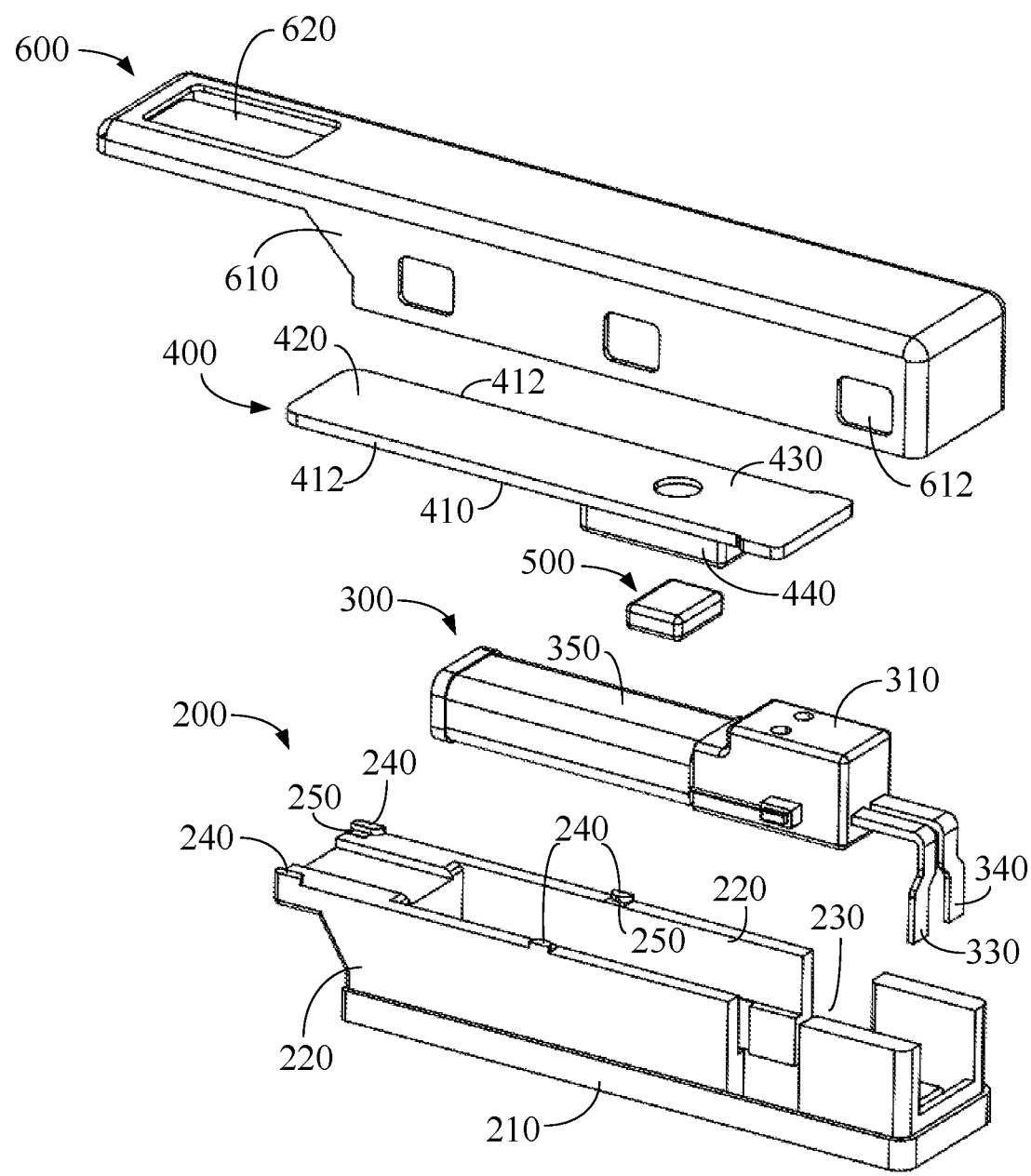
FIG. 2 is an exploded view of the camera shutter of the present disclosure.

Please refer to FIG. 1 and FIG. 2 together. A camera shutter 100 of the present disclosure comprises a supporting portion 200, a winding assembly 300, a movable cover 400, and a magnet 500.

As shown in FIG. 2, the supporting portion 200 comprises a base 210 and two side walls 220 disposed on two sides of the base 210, and the base 210 and the two side walls 220 together define a receiving space 230. The winding assembly 300 is disposed in the receiving space 230. The movable cover 400 is disposed above the supporting portion 200 and the winding assembly 300. A first surface 410 of the movable cover 400 abuts against the two side walls 220 of the supporting portion 200, and the movable cover 400 comprises a shielding side 420 and a magnetic side 430 disposed opposite to the shielding side 420. The magnet 500 is disposed on the magnetic side 430 of the movable cover 400 and is located on the first surface 410 of the movable cover 400. In some embodiments, the first surface 410 of the movable cover 400 abuts against the two side walls 220 of the supporting portion 200 away from an upper side of the base 210.

Figure 5:
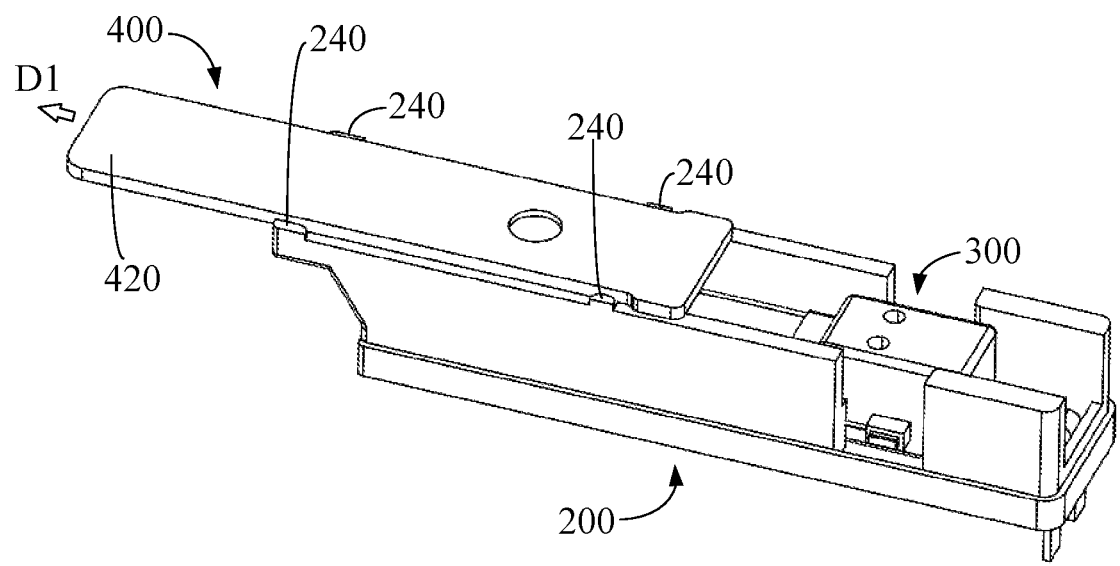
FIG. 5 is a schematic view of a movable cover of the camera shutter in an open state of the present disclosure.

In this way, while a first current passes through the winding assembly 300 to form a first magnetic field, the magnet 500 is adapted to drive the movable cover 400 to move along a first direction D1, and the shielding side 420 of the movable cover 400 can shield the camera (not shown in the drawings). Therefore, as shown in FIG. 5, the movable cover 400 at this time is in an open state to cover the camera.

Figure 6:
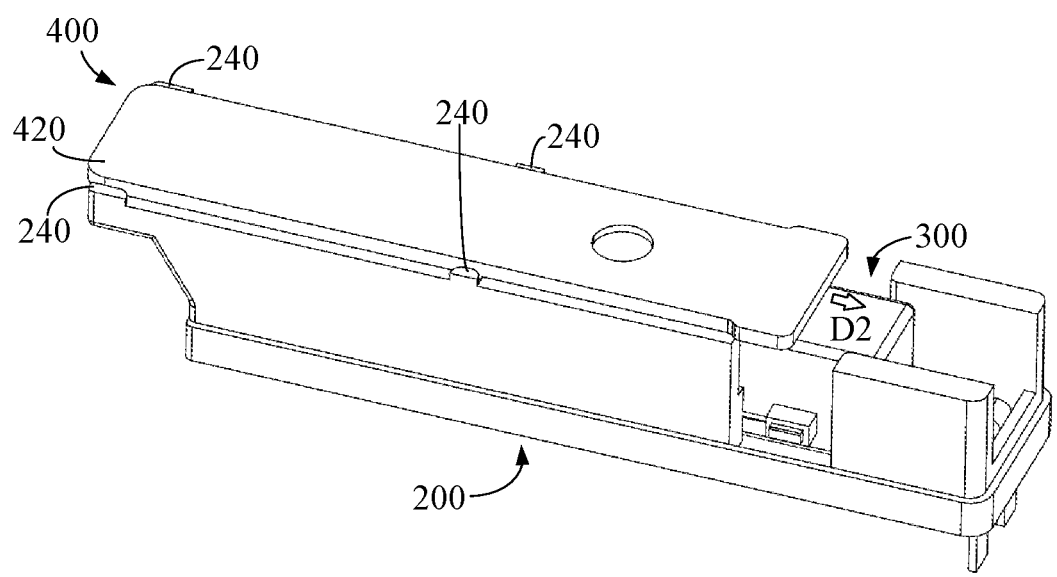
FIG. 6 is a schematic view of the movable cover of the camera shutter in a closed state of the present disclosure.

Conversely, while a second current passes through the winding assembly 300 to form a second magnetic field, the magnet 500 is adapted to drive the movable cover 400 to move along a second direction D2 and move the shielding side 420 of the movable cover 400 away from the camera to expose the camera. Therefore, as shown in FIG. 6, the movable cover 400 at this time is in a closed state to expose the camera.

In other words, after the magnetic field provided by the winding assembly 300 interacts with the magnet 500, it can control the movement and positioning of the movable cover 400 along a horizontal direction.

Figure 12:
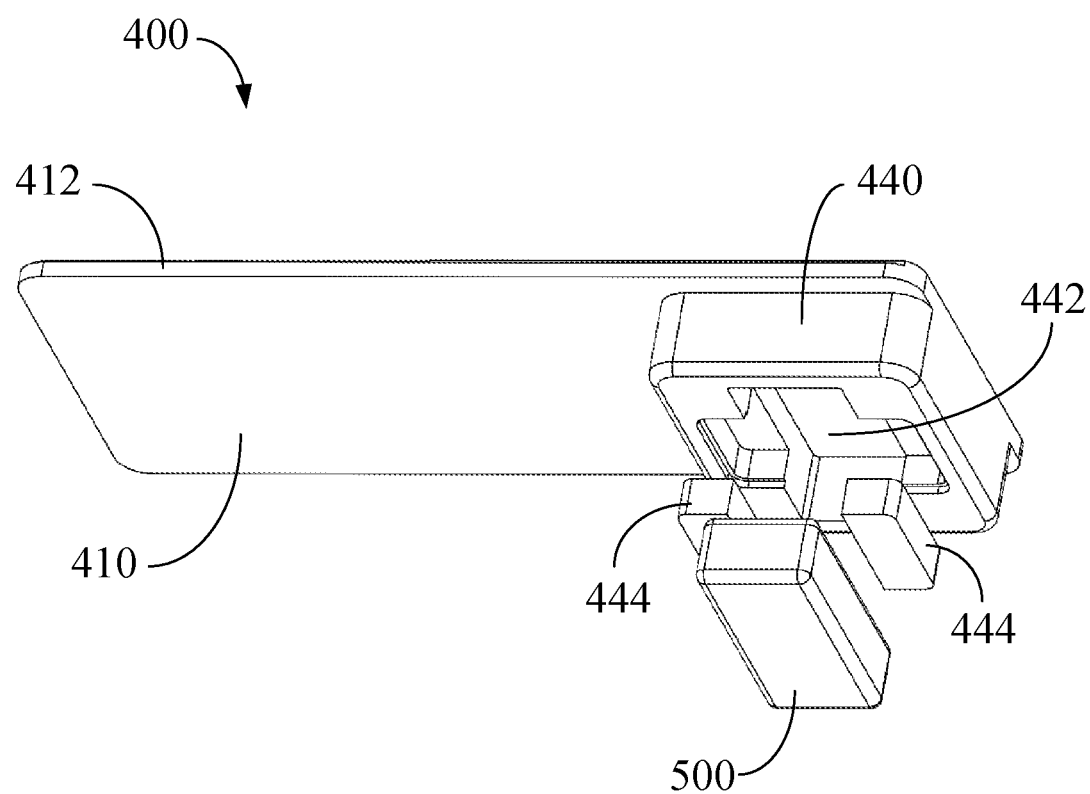
FIG. 12 is an exploded view of the movable cover of the camera shutter of the present disclosure.

As shown in FIG. 12, the movable cover 400 may comprise a protrusion 440. The protrusion 440 is protruded from the first surface 410 of the magnetic side 430 of the movable cover 400. After the camera shutter 100 is assembled, the protrusion 440 is located in the receiving space 230 of the supporting portion 200, and the magnet 500 is disposed in a slot 442 of the protrusion 440.

Through the above arrangement, neither the protrusions 440 nor the magnet 500 of the movable cover 400 has direct contact with the supporting portion 200 during the movement process, thereby effectively reducing friction that the movable cover 400 may experience during the actuation process.

In addition, while the magnet 500 is disposed in the slot 442 of the protrusion 440, the magnet 500 can be fixed in the slot 442 through an arrangement of glue 444.

Figure 3:
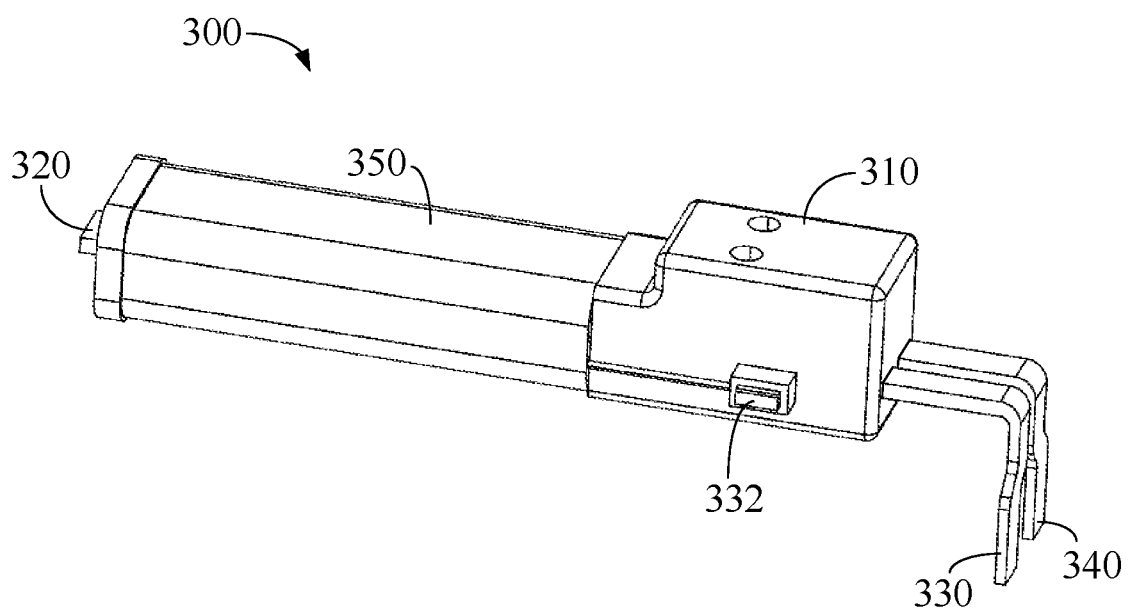
FIG. 3 is a perspective view of a winding assembly of the camera shutter of the present disclosure.
Figure 4:
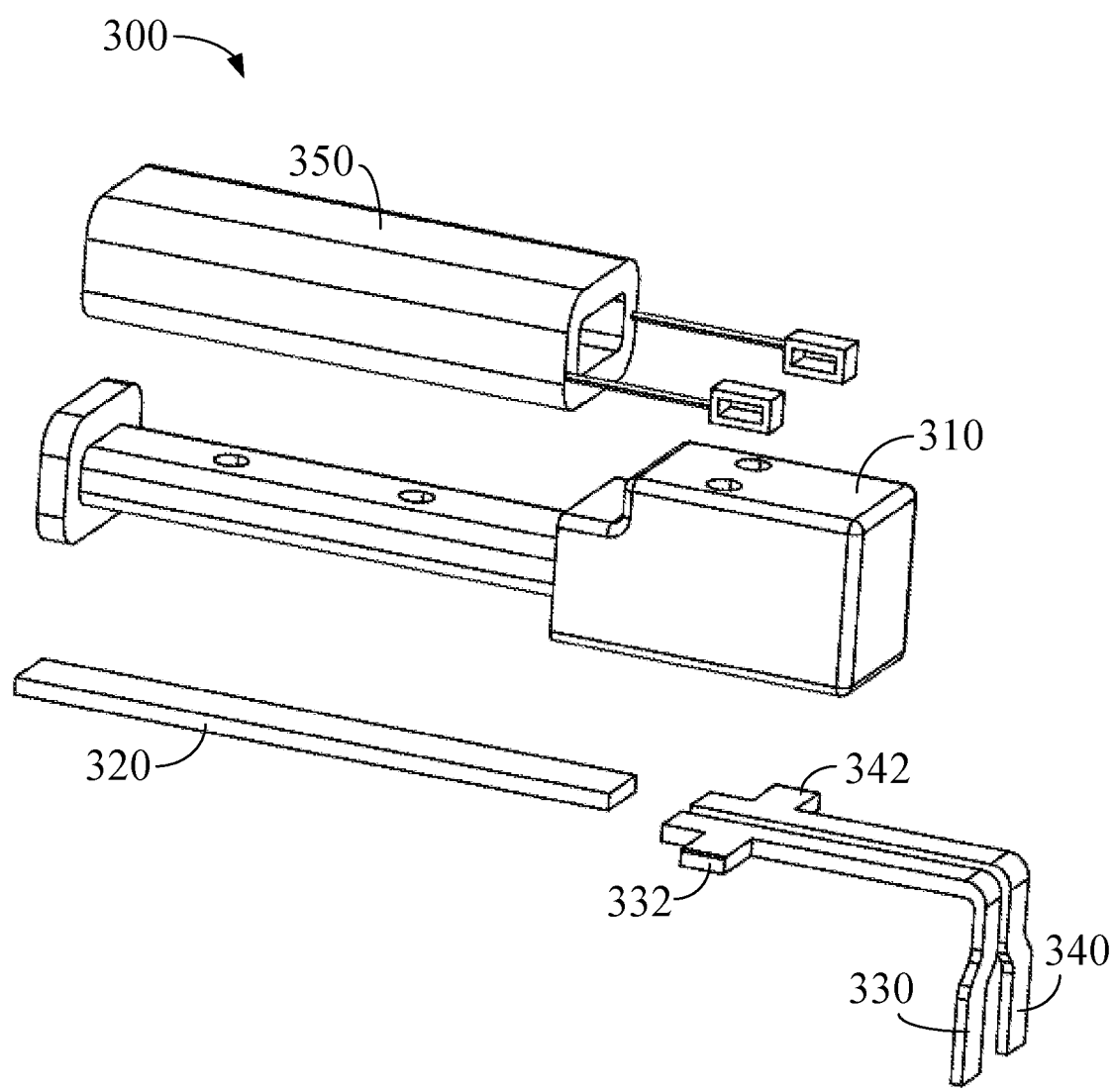
FIG. 4 is a an exploded view of the winding assembly of the camera shutter of the present disclosure.

Please refer to FIG. 3 and FIG. 4 together. The winding assembly 300 of the camera shutter 100 of the present disclosure comprises a base body 310, a magnetic conductive sheet 320, a first pin 330, and a second pin 340. In the present disclosure, the base body 310, the magnetic conductive sheet 320, the first pin 330, and the second pin 340 are combined through an insert molding step. In some embodiments, the base body 310, the magnetic conductive sheet 320, the first pins 330, and the second pins 340 together form an insert molding structure, so that the magnetic conductive sheet 320, the first pin 330, and the second pin 340 can be received inside the base body 310 through a single molding step. Therefore, the insert molding structure formed by an insert molding method has the advantages of high assembly accuracy and fast production efficiency. In addition, the first pin 330 and the second pin 340 respectively comprise a first terminal 332 and a second terminal 342 protruding outward from an inner side of the base body 310 for subsequent winding operations. In some embodiments, before performing the above-mentioned insert molding step, the magnetic conductive sheet 320 and the first pin 330 are formed by cutting and bending a same piece of metal material, which can make a manufacturing process more streamlined. Or the magnetic conductive sheet 320 and the second pin 340 are formed by cutting and bending a same piece of metal material. Or the magnetic conductive sheet 320, the first pin 330, and the second pin 340 are all formed by cutting and bending a same piece of metal material.

Please refer to FIG. 3 and FIG. 4 again, the winding assembly 300 of the present disclosure further comprises a winding 350. The winding 350 can wrap the first terminal 332, the base body 310, and the second terminal 342 in a manner of being wound around the first terminal 332, the base body 310, and the second terminal 342 in sequence. The winding 350 can also wrap the second terminal 342, the base body 310, and the first terminal 332 in a manner of being wound around the second terminal 342, the base body 310, and the first terminal 332 in sequence. In some embodiments, after the base body 310, the magnetic conductive sheet 320, the first pins 330, and the second pins 340 form the insert molding structure through the single molding step, then through the winding step, a wire is wound on the insert molding structure in order to complete the production of the winding assembly 300, which is more streamlined in the manufacturing process. In some embodiments, a portion of the winding 350 wound around the first terminal 332 is welded and fixed to the first terminal 332, and a portion of the winding wire 350 wound around the second terminal 342 is welded and fixed to the second terminal 342. In some embodiments, since the base body 310, the magnetic conductive sheet 320, the first pin 330, and the second pin 340 are formed as a single insert molding structure, it is more convenient to wind the wire through an automated winding device 350 automatically wound around the first terminal 332, the base body 310 and the second terminal 342.

Please refer to FIG. 2, because the magnet 500 of the camera shutter 100 is disposed on the first surface 410 of the movable cover 400 (that is, a surface of the movable cover 400 facing the winding assembly 300), the magnetic conductive sheet 320 located in the base body 310 can generate magnetic attraction with the magnet 500, so that the magnetic conductive sheet 320 and the magnet 500 are attracted to each other, thereby positioning the movable cover 400 along a vertical direction. For example, the magnetic attraction between the magnetic conductive sheet 320 and the magnet 500 causes a certain degree of friction between the first surface 410 of the movable cover 400 and an upper side of the side wall 220. The magnetic field generated by the current applied to the winding assembly 300 generates force that drives the magnet 500 to move along the first direction or the second direction. While the force is greater than a maximum static friction between the first surface 410 of the movable cover 400 and an upper side of the side wall 220 away from the base 210 due to the magnetic attraction, the movable cover 400 can be moved. While no current is applied to the winding assembly 300, the magnetic attraction between the magnetic conductive sheet 320 and the magnet 500 can fix the relative position of the movable cover 400 and the side wall 220. For example, while the movable cover 400 moves to a position where the shielding side 420 shields the camera, the magnetic attraction between the magnetic conductive sheet 320 and the magnet 500 can maintain the shielding side 420 at a position of shielding the camera, and it is not easy to cause the movable cover 400 to move due to external shaking or vibration.

In detail, while the first current or the second current is not applied to the winding assembly 300, the winding assembly 300 does not form a magnetic field to cause the magnet 500 to drive the movable cover 400 to move along the first direction or the second direction. Therefore, the magnet 500 at this time is only attracted by the magnetic conductive sheet 320 disposed below, so as to avoid possible shaking or deviation of the movable cover 400 while the winding assembly 300 is not applied with the first current or the second current.

Figure 7:
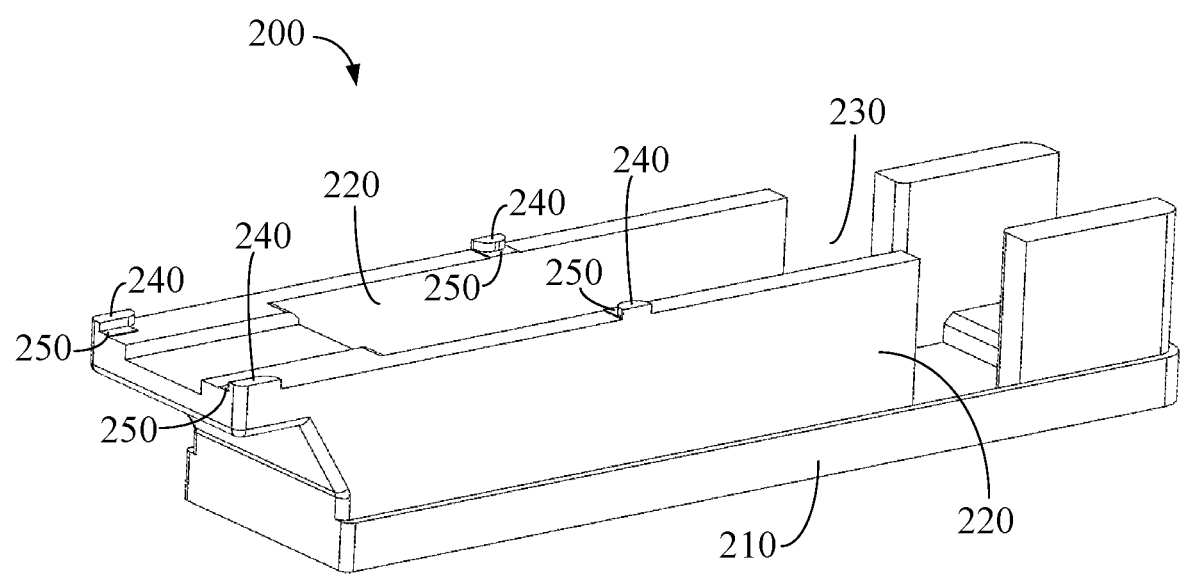
FIG. 7 is a perspective view of a supporting portion of the camera shutter of the present disclosure.

Please refer to FIG. 7, the supporting portion 200 of the camera shutter 100 of the present disclosure comprises a plurality of first limiting structures 240. The plurality of first limiting structures 240 are respectively disposed on an upper side of the two side walls 220 of the supporting portion 200 and contact two second surfaces 412 of the movable cover 400. The two second surfaces 412 are opposite to each other and vertically connected to the first surface 410, and the plurality of first limiting structures 240 are capable of guiding the movement of the movable cover 400 along the first direction and the second direction.

In detail, please refer to FIG. 5 and FIG. 6 together, the plurality of first limiting structures 240 are formed on an upper side of the two side walls 220. Moreover, the plurality of first limiting structures 240 sandwich the movable cover 400 between left and right sides (i.e., the second surface 412) of the movable cover 400, so that the plurality of first limiting structures 240 can guide the movement of the movable cover 400 along the first direction and the second direction.

As shown in FIG. 7, the supporting portion 200 of the camera shutter 100 of the present disclosure may further comprises a plurality of second limiting structures 250. The plurality of second limiting structures 250 are also formed on the upper side of the two side walls 220. However, unlike the plurality of first limiting structures 240, the plurality of second limiting structures 250 support the movable cover 400 from a bottom of the movable cover 400. Therefore, the plurality of second limiting structures 250 only contact the first surface 410 of the movable cover 400 and make the first surface 410 and the upper side of the side wall 220 spaced apart by a specific distance.

Since the plurality of second limiting structures 250 support the movable cover 400 from the bottom of the movable cover 400, the first surface 410 of the movable cover 400 only have a small area of contact with the plurality of second limiting structures 250 during the movement of the movable cover 400 along the first direction or the second direction, in addition to being limited in its movement path by the plurality of first limiting structures 240. Therefore, an arrangement of the plurality of second limiting structures 250 can help reduce the friction generated by the movement of the movable cover 400.

In FIG. 7, the plurality of second limiting structures 250 are adjacent to the plurality of first limiting structures 240. In some embodiments, the first limiting structures 240 are respectively disposed on a side of the second limiting structures 250 away from the upper side of the side wall 220. In other words, the second limiting structures 250 are disposed between the first limiting structures 240 and the sidewall 220. In addition, if the upper side of the side wall 220 is taken as an initial position, a first height of each first limiting structure 240 protruding from the upper side of the side wall 220 is several times higher than a second height of each second limiting structure 250 protruding from the upper side of the side wall 220, and the second height of the second limiting structure 250 is only slightly higher than the upper side of the side wall 220.

Figure 13:
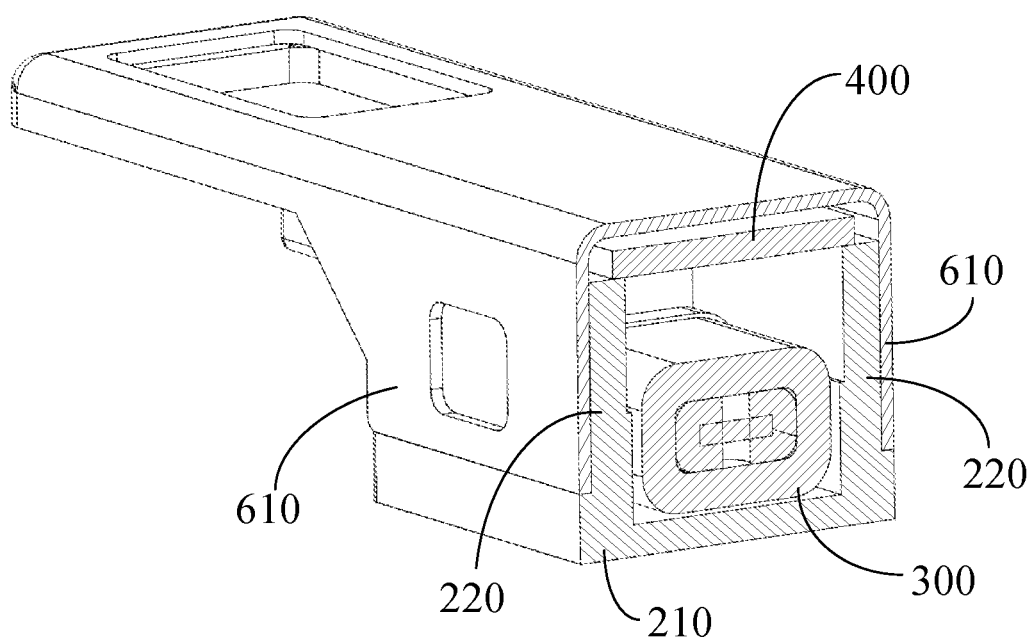
FIG. 13 is a cross-sectional view of a line A-A in FIG. 1.

Please refer to FIG. 1 and FIG. 2 again. The camera shutter 100 of the present disclosure further comprises a housing 600. The housing 600 is disposed above the supporting portion 200 to cover the movable cover 400, the winding assembly 300, and the supporting portion 200 in sequence. As shown in FIG. 13, the housing 600 comprises two housing side walls 610 extending toward the supporting portion 200, and the two housing side walls 610 are capable of abutting against the base 210 of the supporting portion 200. In this way, while the user presses the camera shutter 100 of the present disclosure due to improper force, pressure applied by the user is directly transmitted to the base 210 of the supporting portion 200 via the housing side wall 610 of the housing 600. The housing 600 is not easily deformed by compression and is pressed to the movable cover 400. Therefore, an external force applied to the housing 600 dose not affect the movable cover 400 disposed inside, thereby avoiding a problem that the movable cover 400 is stuck on the winding assembly 300 and cannot move due to the pressure.

Also as shown in FIG. 13, in some embodiments, the housing side wall 610 is also adjacent to the corresponding side wall 220. Therefore, the applied pressure can also be transmitted to the side wall 220, so that the side wall 220 can support the housing side wall 610 to prevent the housing side wall 610 from being deformed under the pressure.

As shown in FIG. 1, a plurality of openings 612 are provided on the housing side wall 610 of the housing 600. The side wall 220 of the supporting portion 200 is exposed from the adjacent opening 612, so that the plurality of openings 612 can be used for dispensing glue to bond the housing 600 and the supporting portion 200. A glue layer formed by dispensing can cover a portion of the side wall 220 exposed from the opening 612 and a portion of the housing side wall 610 around the opening 612 through the opening 612, so that the housing side wall 610 and the side wall 220 of the adjacent supporting portion 200 can be glued and fixed to each other through the glue layer.

Figure 8:
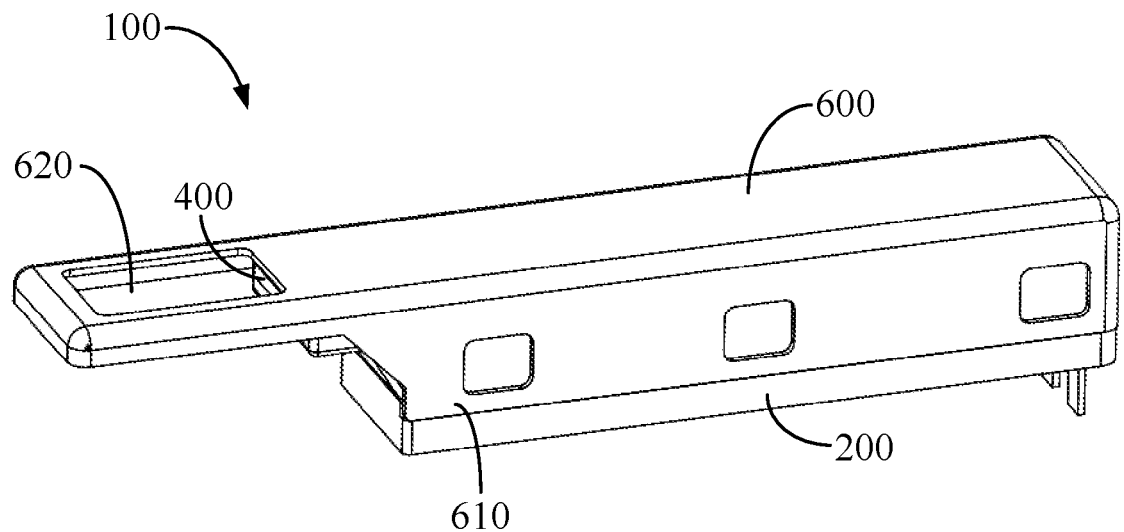
FIG. 8 is a schematic view of the movable cover showing the closed state to expose a camera in an assembled state of the camera shutter of the present disclosure.
Figure 9:
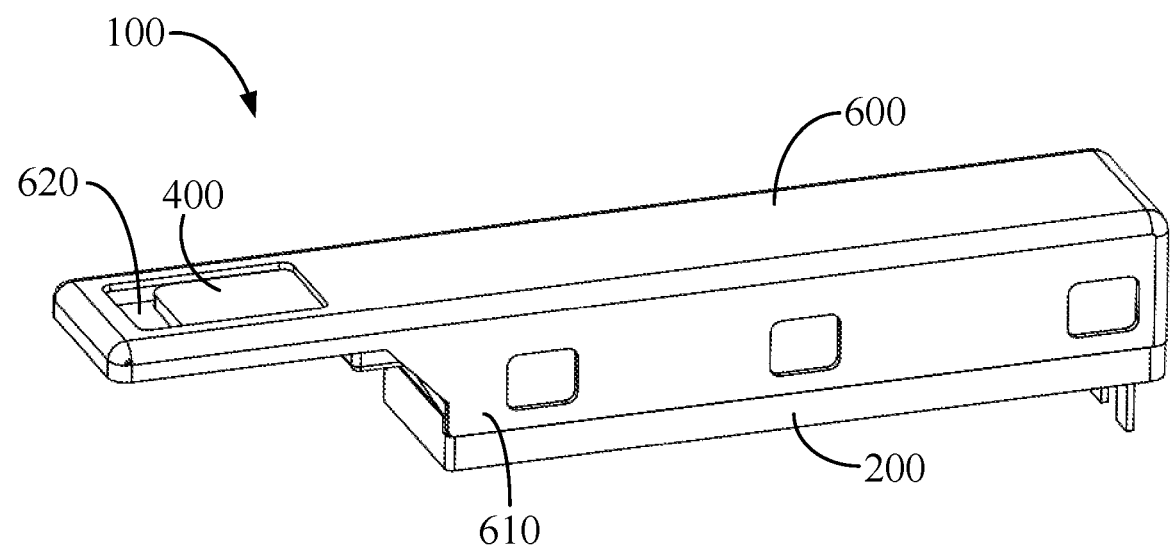
FIG. 9 is a schematic view of the movable cover showing a movement to shield the camera in the assembled state of the camera shutter of the present disclosure.

Moreover, a camera opening 620 is provided on a side of the housing 600 corresponding to the position of the camera. That is, the camera is disposed under the camera opening 620. As shown in FIG. 8, while the movable cover 400 of the camera shutter 100 is in the closed state, the movable cover 400 dose not shield the camera opening 620, so the camera at this time is exposed. As shown in FIG. 9, while the movable cover 400 moves to the left, it gradually closes the camera opening 620, thereby shielding the camera.

Figure 10:
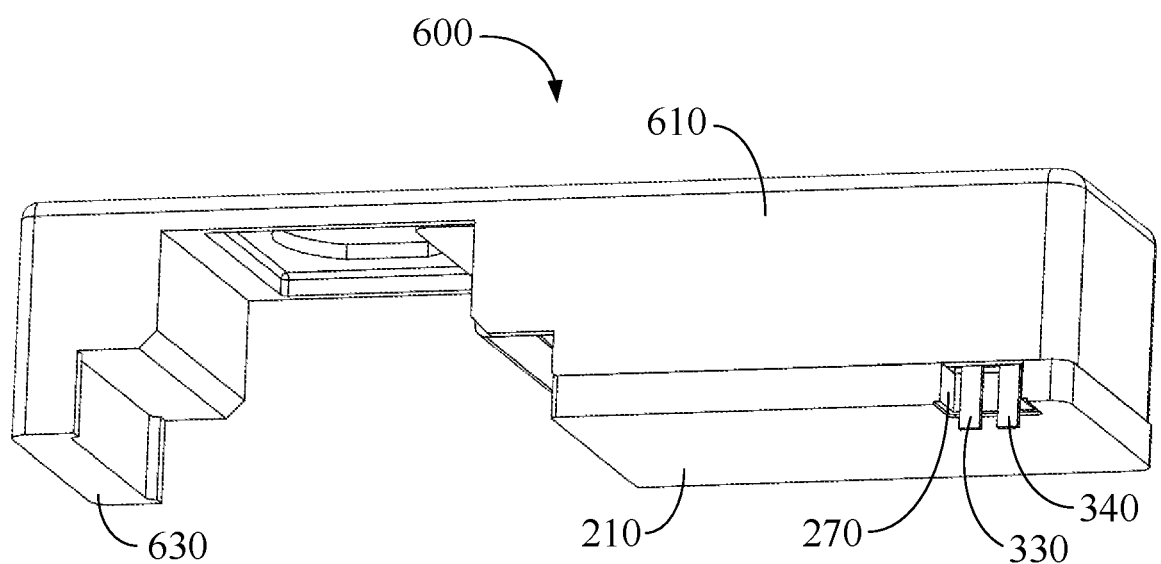
FIG. 10 is a schematic view of a second embodiment of the winding assembly provided on a base in the assembled state of the camera shutter of the present disclosure.
Figure 11:
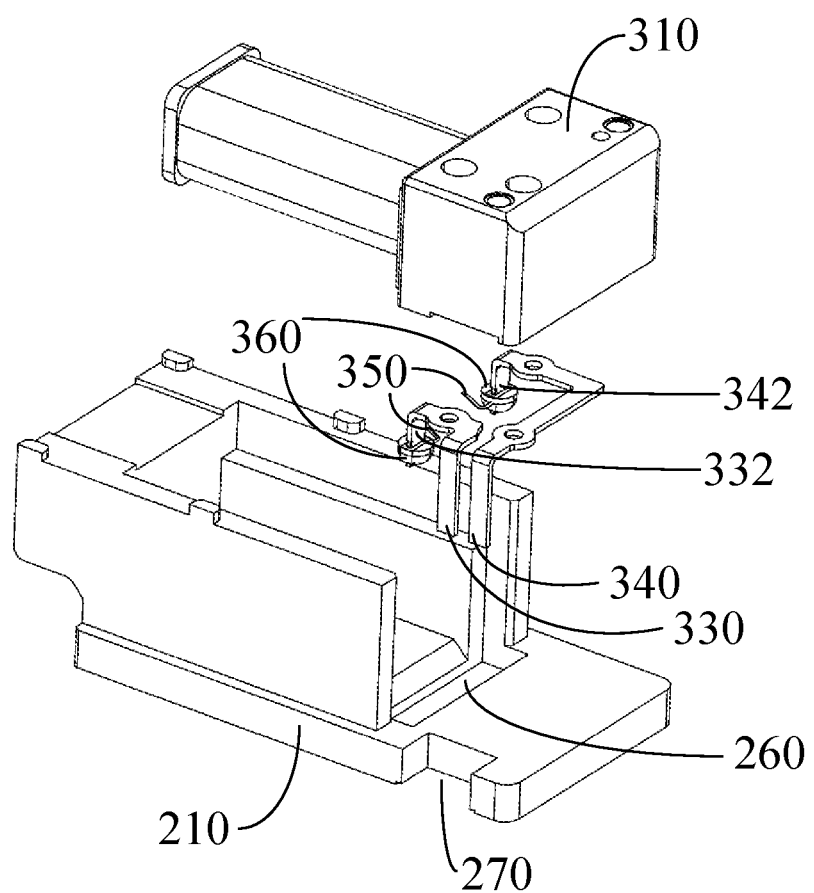
FIG. 11 is an exploded view of the second embodiment of the winding assembly of the camera shutter of the present disclosure.

In the present disclosure, as shown in FIG. 10 and FIG. 11, in another embodiment of the winding assembly 300, the first pin 330 and the second pin 340 of the winding assembly 300 may further extend from a same side of the base body 310 and be received in a side groove 270 of the base 210.

In this aspect, as shown in FIG. 11, the first terminal 332 of the first pin 330 and the second terminal 342 of the second pin 340 can protrude from a lower side of the other end of the base body 310 and be received in a bottom groove 260 of the base 210. By extending the first pin 330 and the second pin 340 on the same side, a structure of the winding assembly 300 can be made more compact, thereby reducing an overall volume of the camera shutter 100, making it more suitable for installation in current thin and light electronic products.

Please refer to FIG. 11 again. In the embodiment, after the winding 350 is wound around the first terminal 332 of the first pin 330 and the second terminal 342 of the second pin 340, two solders 360 can be further disposed on the first terminal 332 with the winding 350 and the second terminal 342 with the winding 350 respectively, thereby strengthening the bonding relationship between the winding 350 and the first terminal 332 and the second terminal 342.

As shown in FIG. 10, the housing 600 has a holding portion 630, and the holding portion 630 is disposed on opposite sides of the two housing side walls 610. The holding portion 630 can be capable of abutting against a structure or a circuit board in a removable electronic product, so as to further increase the strength of the housing 600 withstanding external forces.

In summary, the camera shutter 100 of the present disclosure can control the movement and positioning of the movable cover 400 along the horizontal direction by the principle of magnetic attraction through automatic control, thereby carrying out the exposing and shielding operations of the camera and simplifying the assembly structure and the number of components. In addition, since the movable cover 400 only contacts the plurality of first limiting structures 240 and the plurality of second limiting structures 250 during the movement, it can also avoid wear caused by mutual movement between the movable cover 400 and the supporting portion 200 while reducing the friction. Furthermore, through the magnetic attraction of the magnetic conductive sheet 320 to the magnet 500, the positioning of the movable cover 400 along the vertical direction can also be accurately completed, so as to prevent the possible shaking or shifting of the movable cover 400 while the winding assembly 300 is not applied with the first current or the second current.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera shutter for exposing or shielding a camera, comprising:
 a supporting portion, wherein the supporting portion comprises a base and two side walls disposed on two sides of the base, and the base and the two side walls define a receiving space;
 a winding assembly disposed in the receiving space;
 a movable cover disposed above the supporting portion and the winding assembly, wherein a first surface of the movable cover abuts against the two side walls of the supporting portion, and the movable cover comprises a shielding side and a magnetic side opposite to the shielding side; and
 a magnet disposed on the magnetic side of the movable cover and is located on the first surface of the movable cover;
 wherein the winding assembly is capable of driving the magnet to move the movable cover along a first direction while a first current passes through the winding assembly to form a first magnetic field to make the shielding side of the movable cover shield the camera; and
 the winding assembly is also capable of driving the magnet to move the movable cover along a second direction while a second current passes through the winding assembly to form a second magnetic field to make the shielding side of the movable cover away from the camera to expose the camera,
 wherein the winding assembly comprises a base body, a magnetic conductive sheet, a first pin and a second pin, the base body, the magnetic conductive sheet, the first pin, and the second pin together form an insert molding structure, and the first pin and the second pin respectively have a first terminal and a second terminal protruding outward from the base body.

2. The camera shutter according to claim 1, wherein the movable cover comprises a protrusion, the protrusion is protruded on the first surface of the magnetic side of the movable cover and located in the receiving space of the supporting portion, and the magnet is disposed in a slot of the protrusion.

3. The camera shutter according to claim 1, wherein the first pin and the second pin protrude from a same side of the base body and are received in a side groove of the base.

4. The camera shutter according to claim 3, wherein the first terminal of the first pin and the second terminal of the second pin protrude from a lower side of the base body and are received in a bottom groove of the base.

5. The camera shutter according to claim 1, wherein the winding assembly further comprises a winding, the winding is wound on the first terminal, the base body, and the second terminal in sequence, or the winding is wound on the second terminal, the base body, and the first terminal in sequence.

6. The camera shutter according to claim 5, wherein the winding assembly further comprises two solders, and the two solders are respectively disposed on the first terminal with the winding and the second terminal with the winding.

7. The camera shutter according to claim 1, wherein the magnetic conductive sheet and the magnet are configured to attract each other by magnetic force to carry out the positioning of the movable cover.

8. The camera shutter according to claim 1, wherein the supporting portion comprises a plurality of first limiting structures, and the plurality of first limiting structures are respectively disposed on an upper side of the two side walls of the supporting portion and contact two second surfaces of the movable cover, the two second surfaces are opposite to each other and vertically connected to the first surface, and the plurality of first limiting structures are capable of guiding the movement of the movable cover along the first direction and the second direction.

9. The camera shutter according to claim 8, wherein the supporting portion comprises a plurality of second limiting structures, and the plurality of second limiting structures are respectively disposed on the upper side of the two side walls of the supporting portion, the plurality of second limiting structures are capable of supporting the movable cover, and the plurality of second limiting structures are in contact with the first surface of the movable cover and space the first surface and the upper side of the two side walls from each other.

10. The camera shutter according to claim 8, wherein the plurality of first limiting structures are respectively disposed on a side of the plurality of second limiting structures away from the upper side of the two side walls of the supporting portion.

11. The camera shutter according to claim 1, further comprising a housing, wherein the housing is disposed above the supporting portion to cover the movable cover, the winding assembly, and the supporting portion in sequence, the housing comprises two housing side walls extending toward the supporting portion, and the two housing side walls are capable of abutting against the base of the supporting portion.

12. The camera shutter according to claim 11, wherein the housing side walls are provided with a plurality of openings, each of the side walls of the supporting portion is exposed from the plurality of openings adjacent to the side wall, and the plurality of openings are capable of dispensing glue to bond the housing side walls and the side walls of the supporting portion.

13. The camera shutter according to claim 11, wherein the housing comprises a holding portion, and the holding portion is disposed on opposite sides of the two housing side walls.

14. The camera shutter according to claim 11, wherein the first pin and the second pin protrude from a same side of the base body and are received in a side groove of the base, and the first terminal of the first pin and the second terminal of the second pin protrude from a lower side of the base body and are received in a bottom groove of the base.

15. The camera shutter according to claim 14, wherein the winding assembly further comprises a winding, the winding is wound on the first terminal, the base body, and the second terminal in sequence, or the winding is wound on the second terminal, the base body, and the first terminal in sequence.

16. The camera shutter according to claim 11, wherein the supporting portion comprises a plurality of first limiting structures, and the plurality of first limiting structures are respectively disposed on an upper side of the two side walls of the supporting portion and contact two second surfaces of the movable cover, the two second surfaces are opposite to each other and vertically connected to the first surface, and the plurality of first limiting structures are capable of guiding the movement of the movable cover along the first direction and the second direction.

17. The camera shutter according to claim 16, wherein the supporting portion comprises a plurality of second limiting structures, and the plurality of second limiting structures are respectively disposed on the upper side of the two side walls of the supporting portion, the plurality of second limiting structures are capable of supporting the movable cover, and the plurality of second limiting structures are in contact with the first surface of the movable cover and space the first surface and the upper side of the two side walls from each other.

* * * * *